May 1, 1956  R. T. CORNELIUS  2,743,970
CAST CONNECTING ROD COMPRISING BALL BEARING
Filed Oct. 12, 1950  2 Sheets-Sheet 1

INVENTOR
RICHARD T. CORNELIUS
BY
ATTORNEYS

May 1, 1956 R. T. CORNELIUS 2,743,970
CAST CONNECTING ROD COMPRISING BALL BEARING
Filed Oct. 12, 1950 2 Sheets-Sheet 2

INVENTOR
RICHARD T. CORNELIUS
BY Caswell & Raynard
ATTORNEYS

United States Patent Office 2,743,970
Patented May 1, 1956

2,743,970

CAST CONNECTING ROD COMPRISING BALL BEARING

Richard T. Cornelius, Minneapolis, Minn.

Application October 12, 1950, Serial No. 189,781

3 Claims. (Cl. 308—184)

The herein disclosed invention relates to inserts in castings adapted to shrink on cooling and to the resultant structure formed thereby, and particularly to connecting rods.

An object of the invention resides in applying to the surface of the insert subject to stresses occasioned by the shrinking of the casting a covering of compressible material.

Another object of the invention resides in applying to the covering a retainer for holding the same applied to the insert.

A still further object of the invention resides in utilizing as the covering sheet material adapted to be wrapped around the denoted surface of the insert.

An object of the invention resides in utilizing a strip of the covering material which, when the invention is to be used in connection with a bearing to be inserted into a cast connecting rod, is wrapped about the outer surface of the outer race of the bearing.

A still further object of the invention resides in applying a metal band encircling the covering and in crimping together the ends of the band to hold the covering in place upon the bearing.

Other objects of the invention reside in the novel combination and arrangement of parts and in the details of construction hereinafter illustrated and/or described.

In the drawings has been shown a compressor of the diaphragm type similar to that illustrated in my copending application for Diaphragm Pumps, filed December 2, 1949, Serial Number 130,727. This pump has a connecting rod connected to the diaphragm which is provided with a ball bearing adapted to be rotatably mounted on a crank shaft whereby the connecting rod is reciprocated. The connecting rod is constructed of a plastic material which is cast about the bearing and the bearing illustrated is a ball bearing. In the construction of such a piston the shrinkage of the boss about the bearing is so great as to either crack the casting or to stress the bearing to such a degree that the balls no longer freely rotate within the outer race of the same. With the instant invention a sheet of compressible material which may consist of ground cork and rubber is wrapped about the outer race of the bearing. This material is compressible to an extent such that the same becomes fully compressed when the casting has cooled to normal temperature. For retaining the covering in place a metal band is employed which encircles the covering, the ends of which are crimped together to form a retainer encircling the covering and serving to hold the same in place on the race. In carrying out the method the covering is first placed upon the outer surface of the race, the retainer band is then applied to the same and the ends of the band crimped together. The parts now become securely attached. The insert with attached parts is then inserted into the mold and the casting formed about the covering, retainer and a part of the outer race of the ball bearing. When the casting cools and shinks the shrinkage is taken up by the compression of the covering and when the casting has reached normal temperature the covering is fully compressed.

Figure 1:
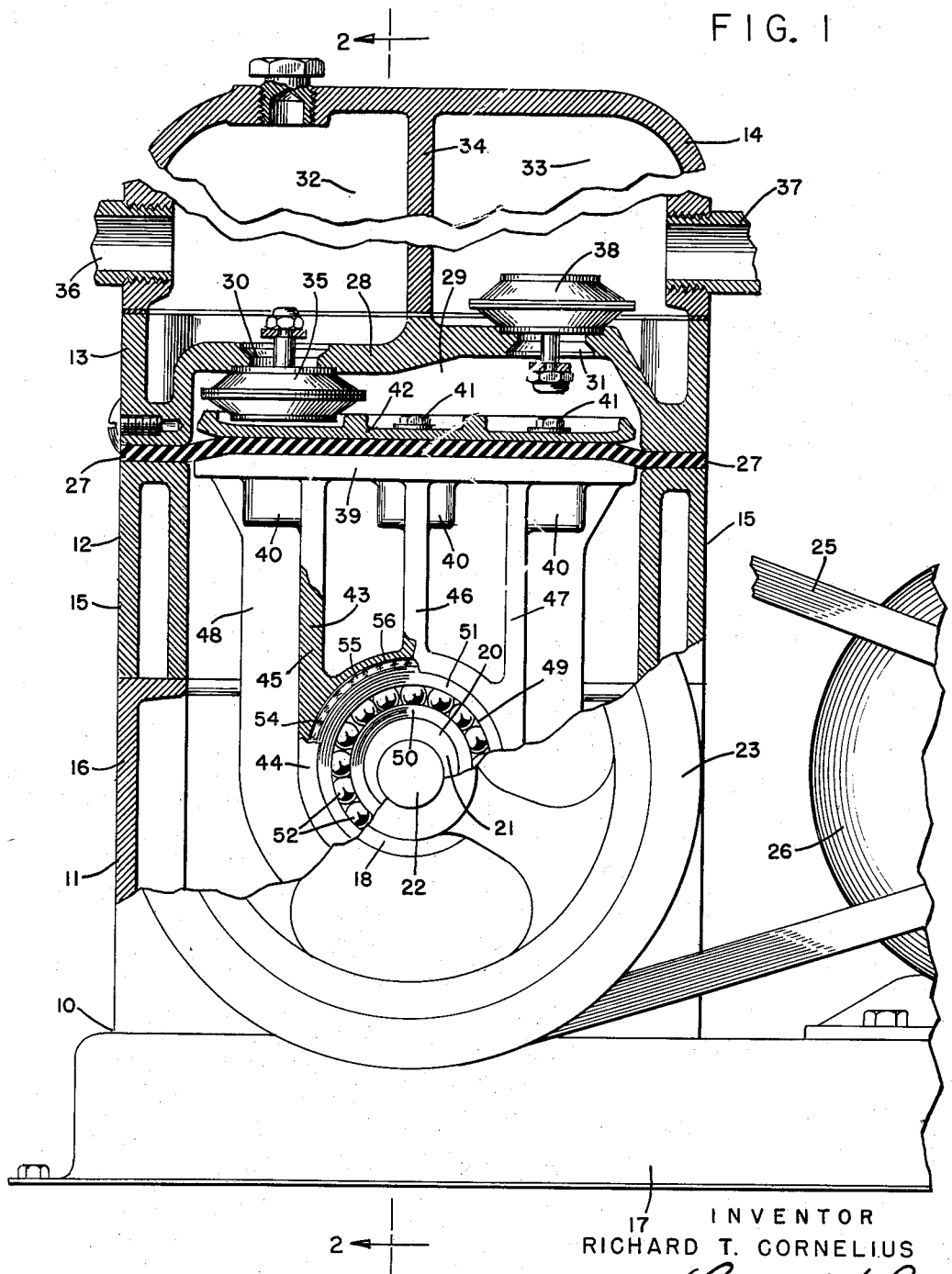
Fig. 1 is an elevational view of a compressor illustrating an embodiment of the invention and having parts cut away to more clearly show the construction of the same.
Figure 2:
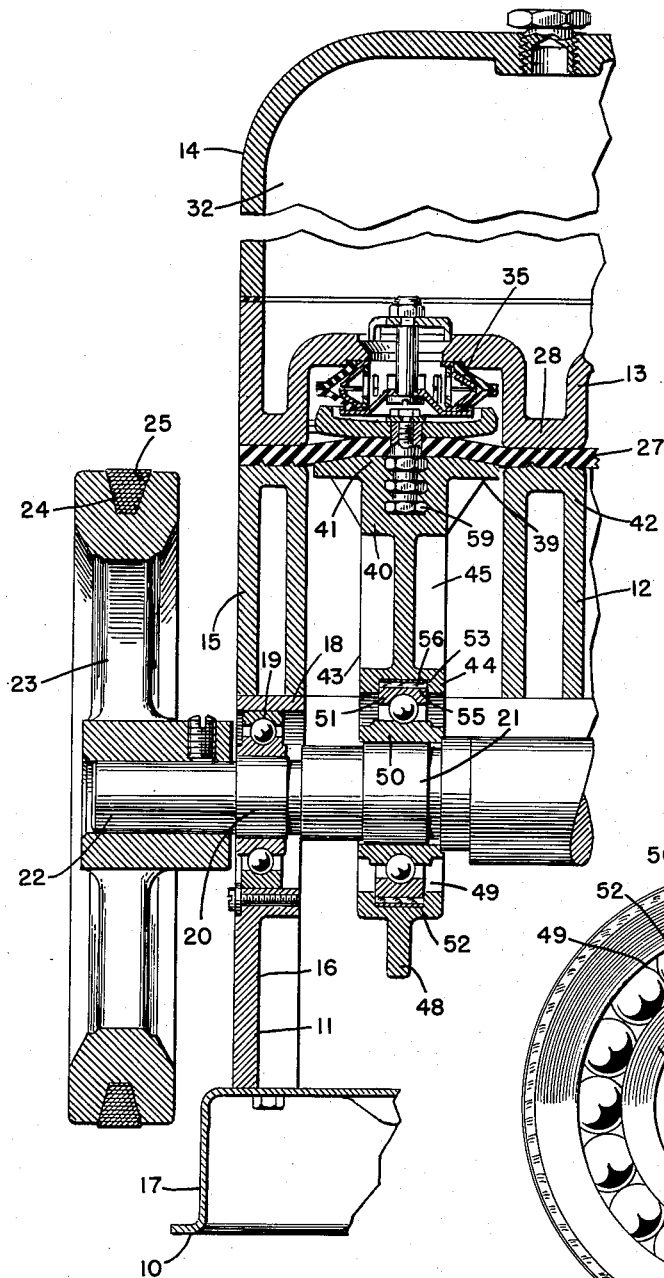
Fig. 2 is a vertical sectional view taken on line 2—2 of Fig. 1.

For the purpose of illustrating the application of the invention a compressor 10 has been shown. This compressor consists of a base 11, a body 12 resting upon said base, a head 13 overlying the body and a cap 14 mounted on top of the head 13.

The body 12 is generally rectangular in form having vertically extending walls 15. The base 11 has walls 16 which register with the walls 15. The base 11 may be supported on a sub base 17 constructed in any suitable manner.

In the base 11 are formed bosses 18 which receive two ball bearings 19. These ball bearing rotatably support a crank shaft 20 having a crank 21 formed on the same and disposed in eccentric relation with respect to the axis of the bearings 19. The outer end 22 of the shaft 20 projects outwardly beyond the base 11 and has attached to it a flywheel 23 which is formed with a groove 24 in the periphery thereof. A V-belt 25 is disposed in this groove and is driven by an electric motor 26 also mounted on the sub base 17.

Between the body 12 and the head 13 is a diaphragm 27 which is constructed of some flexible material such as rubber fabric or the like. This diaphragm is clamped in position between these parts by means of bolts which extend jointly through the cap 14, the head 13, the body 12 and are screwed into the base 11 and which have not been shown in the drawings.

The head 13 is formed with a horizontal wall structure 28 which forms in said head a chamber 29 disposed between the diaphragm 27 and said wall structure. The said wall structure is formed with two openings 30 and 31 which are adapted to bring the chamber 29 in communication with an inlet chamber 32 and an outlet chamber 33 formed in the cap 14 by means of a partition 34 disposed across said cap and engaging the wall structure 28. A conduit 36 connected to the cap 14 directs the fluid to be pumped into the chamber 32 while another conduit 37 connected to said cap leads the fluid from the chamber 33. An inlet valve 35 carried by the wall structure 28 and disposed within the chamber 29 serves to allow the fluid entering the chamber 32 to be drawn into the chamber 29. A similar outlet valve 38 disposed in chamber 33 permits the fluid in chamber 29 to pass into chamber 33. Inasmuch as the valves 35 and 38 form no particular feature of the instant invention the same will not be described in detail, and it will readily be comprehended that any suitable type of valve structure may be utilized.

The diaphragm 27 is flexed by means of a piston 39. This piston is formed with a number of bosses 40 which are threaded to receive screws 41. The said screws pass through a follower 42 which overlies the upper surface of the diaphragm 27 and also through the said diaphragm and serve to clamp the piston 39 and the follower 42 securely to the diaphragm.

The piston 39 is mounted on the end of a connecting rod 43. This connecting rod has a boss 44 formed on the same and which has projecting upwardly from it three legs 45, 46 and 47. These legs are integral with the piston 39. For reinforcing the structure a flange 48 is employed which is connected to the piston 39 and which extends about the legs 45 and 47 and the boss 44 and which is integral therewith.

The boss 44 receives and carries a ball bearing 49 which is provided with an inner race 50, an outer race 51 and with balls 52 therebetween. The inner race 50 encircles the crank 21 and is mounted thereon through a drive fit, while the race 51 is received in a groove 53 formed in the boss 44.

Figure 3:
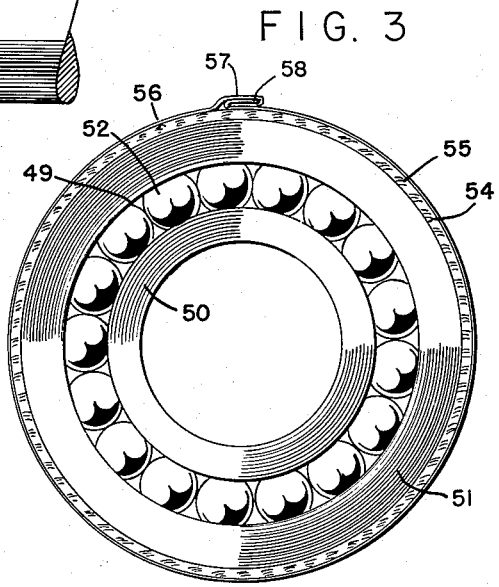
Fig. 3 is an elevational view of a ball bearing such as is used with the crank shaft of the compressor and illustrating the covering and retainer applied thereto and drawn to an enlarged scale.

The piston 39 and connecting rod 43 are preferably constructed of a plastic material which is formed in the customary manner by casting the said parts in a suitable mold. The bearing 49 is inserted into the mold and the casting formed about the same. Applicant found that with the ordinary plastic materials employed that considerable shrinkage occurred and that the stresses placed on the bearing 49 and the boss 44 were very great. In some instances the boss 44 would crack open and in other instances so great a pressure would be placed on the outer race 51 of the ball bearing that the inner race would no longer travel freely with reference thereto. To solve this disadvantage applicant utilized the following method and construction. As shown in Fig. 3 applicant placed about the outer surface 54 of the race of the bearing a covering 55 consisting of a strip of flexible sheet material constructed of a substance capable of being compressed. Applicant found that a particular sheet material constructed of ground cork and rubber served the purpose. In such case the cork is somewhat compressible and though the rubber is incompressible the same held the particles of cork together and permitted of compressing the same. The covering 55 is held in position by means of a retainer 56 constructed as a band of sheet metal which is arranged to encircle the covering 55. This band has its ends 57 and 58 formed in the shape of hooks which are hooked or crimped together to hold the band in place. This construction retains the covering 55 in position. In the manufacture of the connecting rod the assembly consisting of the ball bearing 49, the covering 55 and the retainer 56 are inserted in the mold in which the connecting rod is to be cast. The forming of the connecting rod then proceeds along the usual lines and the casting is completed and removed from the mold in the customary manner. As the casting shrinks the covering 55 is compressed and the strain ordinarily resulting is eliminated. The retainer 56, due to the method of connecting the ends of the same, may slip slightly at the connection between the ends thereof to accommodate the reduction in circumference of the same and the covering 55 as the material of the boss 44 shrinks. By varying the thickness of the covering and also by the composition of the same any degree of compressibility can be procured. By selecting a suitable thickness and composition of material the covering may be fully compressed when the casting shrinks to its fullest extent. Thus the ball bearing is rigidly held in place in the casting and without the casting being unduly stressed. If desired, a slightly greater thickness of material than required can be utilized and in such event a slight cushioning effect is produced.

The advantages of the invention are manifest. The method and structure produces a connecting rod capable of being cast from any suitable material adapted to shrink upon cooling and particularly to connecting rods formed from plastic materials such as phenol formaldehyde products. A connecting rod constructed in accordance with the invention will withstand considerably greater misuse than a connecting rod in which the parts are highly stressed. Applicant's construction will not crack or fail after repeated use. The method can be employed with ordinary equipment now used for forming castings of the type desired and adds very slightly to the cost of the connecting rod.

Changes in the specific form of the invention, as herein described, may be made within the scope of what is claimed without departing from the spirit of the invention.

What is claimed as new and desired to be protected by Letters Patent is:

1. A connecting rod comprising a ball bearing having an outer race, a covering of sheet material encircling the outer surface of said race, said covering being constructed of compressible material, a metal band encircling said covering and holding the same applied to said ball bearing and a one piece cast boss formed on said rod extending completely about said band, covering a portion of said race at the ends thereof and engaging said portion to completely enclose said band and covering.

2. In combination a one piece casting constructed of a material shrinking upon cooling, a ball bearing having an outer race, a covering of sheet material formed of ground cork and rubber encircling the outer surface of said race and extending up to the end surfaces thereof, a metal band of substantially the same width as said covering and encircling said covering and holding the same applied to said race, said casting completely enveloping the outer part of said race, covering and said band, and radially extending flanges on said casting engaging the ends of said race and enclosing the ends of said covering and band.

3. In combination a one piece casting constructed of a material shrinking upon cooling, a ball bearing having an outer race, a covering of sheet material formed of ground cork and rubber encircling the outer surface of said race and extending up to the end surfaces thereof, a metal band of substantially the same width as said covering and encircling said covering and holding the same applied to said race, said band being constructed from a strip of metal formed at its ends with interengaged hooks, said casting completely enveloping the outer part of said race, covering and said band, and radially extending flanges on said casting engaging the ends of said race and enclosing the ends of said covering and band.

References Cited in the file of this patent

UNITED STATES PATENTS

| Number | Name | Date |
|---|---|---|
| 1,821,873 | Best | Sept. 1, 1931 |
| 1,907,303 | Peterson | May 2, 1933 |
| 1,921,488 | Smith | Aug. 8, 1933 |
| 1,931,026 | Lee | Oct. 17, 1933 |
| 1,949,135 | Wirth | Feb. 27, 1934 |
| 2,098,073 | Tucker | Nov. 2, 1937 |
| 2,222,729 | Verplanck | Nov. 26, 1940 |
| 2,230,744 | Disbro | Feb. 4, 1941 |
| 2,253,412 | Young | Aug. 19, 1941 |
| 2,271,511 | Doughty | Feb. 3, 1942 |
| 2,283,839 | Wright | May 19, 1942 |
| 2,307,874 | Bilde | Jan. 12, 1943 |
| 2,355,443 | Jeffery | Aug. 8, 1944 |
| 2,429,340 | Bailey | Oct. 21, 1947 |